US007020892B2

(12) United States Patent
Levesque et al.

(10) Patent No.: US 7,020,892 B2
(45) Date of Patent: *Mar. 28, 2006

(54) TIME-SHIFTED VIDEO SIGNAL PROCESSING

(75) Inventors: Alain P. Levesque, Pleasanton (CA); Tim Vehling, San Jose, CA (US); Song Jin, San Jose, CA (US); David L. Recker, Saratoga, CA (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/390,090

(22) Filed: Sep. 3, 1999

(65) Prior Publication Data

US 2003/0170003 A1    Sep. 11, 2003

(51) Int. Cl.
H04N 7/173 (2006.01)
H04N 7/16 (2006.01)
H04N 5/91 (2006.01)
H04N 7/00 (2006.01)
H04N 9/79 (2006.01)

(52) U.S. Cl. .................. 725/89; 725/55; 725/88; 725/90; 725/93; 725/102; 725/115; 725/116; 725/134; 725/142; 725/145; 725/146; 348/705; 348/731; 386/35; 386/46; 386/68; 386/124

(58) Field of Classification Search ............ 725/88–90, 725/102, 134, 142, 93, 115–116, 145–146, 725/55; 386/35, 68, 45–46, 70, 125–126, 386/124; 348/705, 731; 369/704, 174–175
See application file for complete search history.

(56) References Cited

U.S. PATENT DOCUMENTS

| 5,241,428 | A | * | 8/1993 | Goldwasser et al. | 386/109 |
|---|---|---|---|---|---|
| 5,311,317 | A | * | 5/1994 | Ogura et al. | 348/731 |
| 5,317,399 | A | * | 5/1994 | Satake et al. | 348/571 |
| 5,329,320 | A | * | 7/1994 | Yifrach | 348/559 |
| 5,400,076 | A | * | 3/1995 | Iwamura | 375/240.15 |
| 5,452,023 | A | * | 9/1995 | Kim | 348/731 |
| 5,510,840 | A | * | 4/1996 | Yonemitsu et al. | 375/240.15 |
| 5,701,383 | A | * | 12/1997 | Russo et al. | 360/63 |
| 5,933,192 | A | * | 8/1999 | Crosby et al. | 348/731 |
| 5,990,881 | A | * | 11/1999 | Inoue et al. | 345/720 |
| 6,018,612 | A | * | 1/2000 | Thomason et al. | 386/125 |
| 6,169,842 | B1 | * | 1/2001 | Pijnenburg et al. | 386/109 |
| 6,226,447 | B1 | * | 5/2001 | Sasaki et al. | 386/112 |
| 6,240,244 | B1 | * | 5/2001 | Ikeda | 386/125 |
| 6,300,981 | B1 | * | 10/2001 | Kim et al. | 348/563 |
| 6,349,410 | B1 | * | 2/2002 | Lortz | 725/110 |
| 6,480,667 | B1 | * | 11/2002 | O'Connor | 386/83 |

OTHER PUBLICATIONS

Harry Newton, Newton's Telecom Dictionary, Jan. 1998, Telecom Books and Flatiron Publishing, Thirteenth Expanded and Updated Edition, p. 198.*

* cited by examiner

*Primary Examiner*—John Miller
*Assistant Examiner*—Michael W. Hoye
(74) *Attorney, Agent, or Firm*—Christopher P. Maiorana, P.C.

(57) ABSTRACT

A time-shifted video method has a real-time mode during which real-time video frames are delivered for display. In a time-shifted mode, time-shifted video frames are delivered for display. The time-shifted video frames are delayed relative to the real-time video frames. A real-time frame is paused during a transition from the real-time mode to the time-shifted mode.

23 Claims, 7 Drawing Sheets

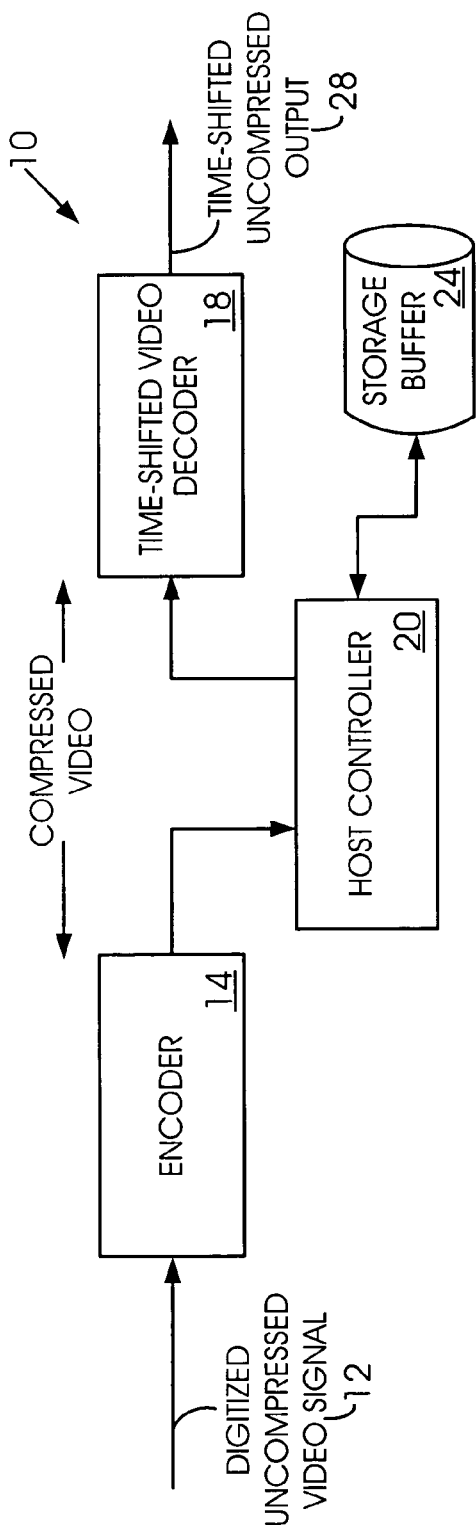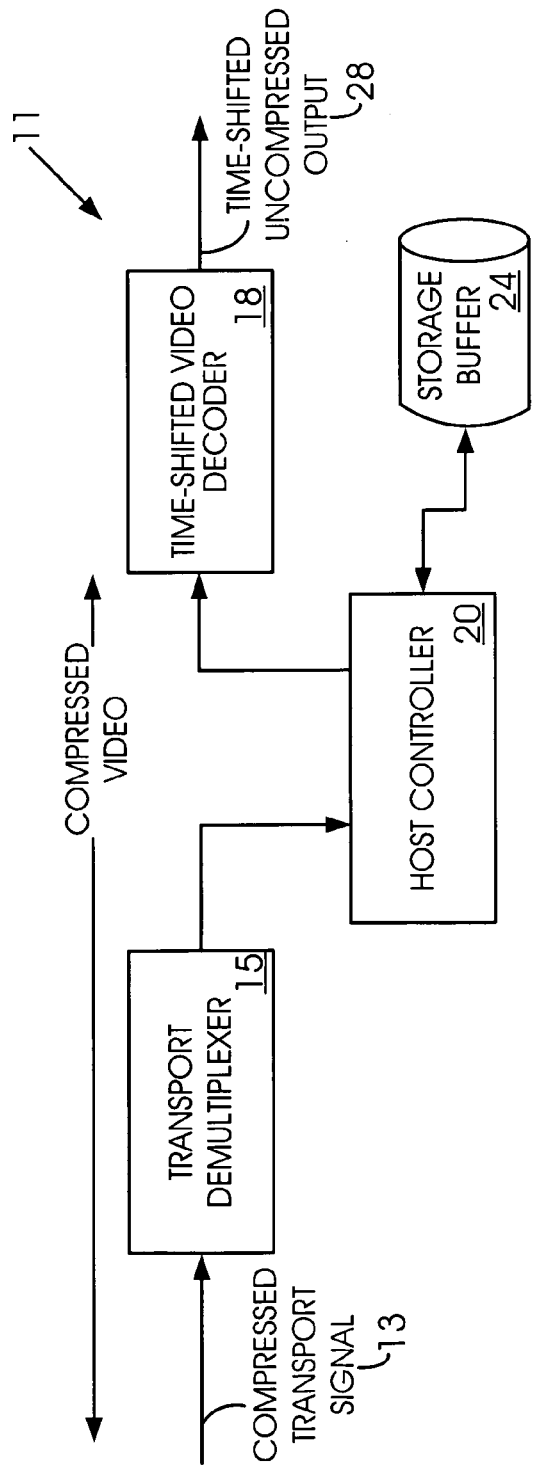

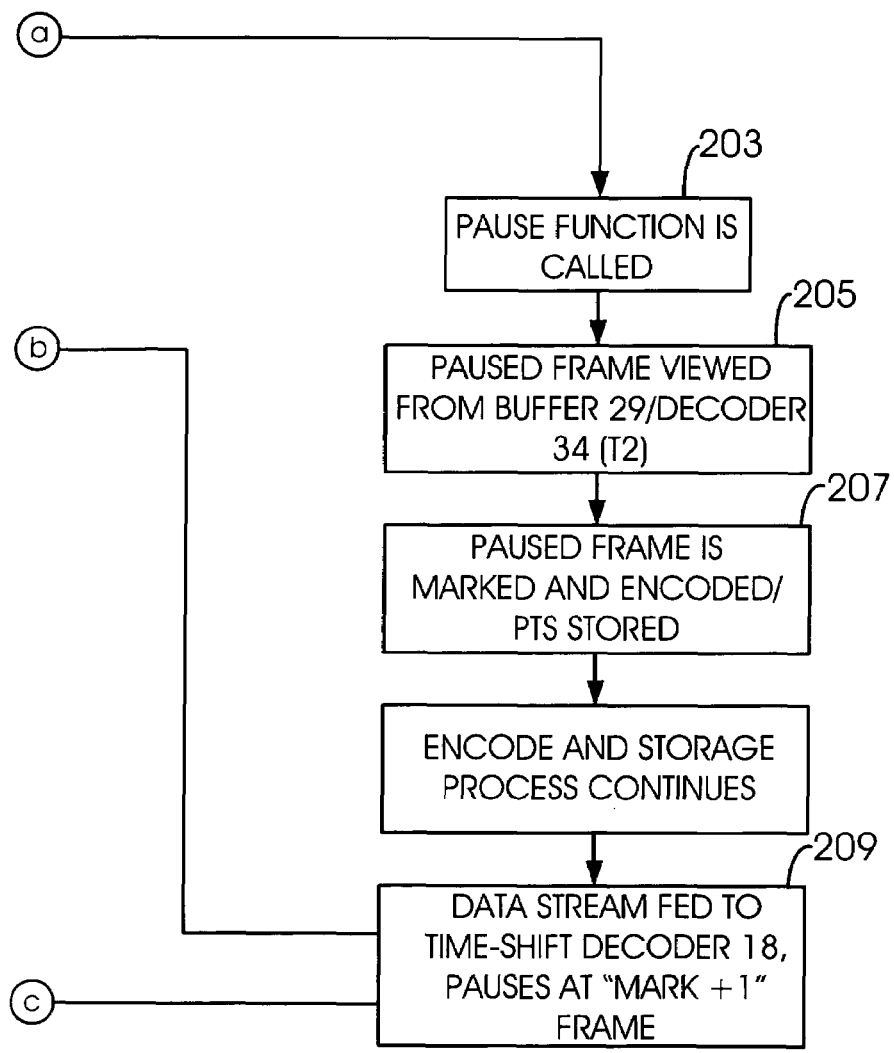
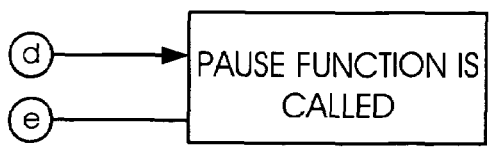
FIG. 5B

TIME-SHIFTED VIDEO SIGNAL PROCESSING

FIELD OF INVENTION

This invention relates to time-shifted video signal processing.

BACKGROUND OF THE INVENTION

A viewer of "real-time" video cannot normally perform the kinds of "trick" functions, such as pause, play, fast forward, or reverse, that are available for recorded video.

By providing a system that can play back stored material while simultaneously and continuously storing the real-time video signal, it is possible to create a user experience that is the same for both "real-time" and pre-recorded material. The play back can be delayed (time-shifted) by as much as the storage size, and as little as the system delay, referred to as "near real time". The trick functions then can be provided from the stored version.

In such a system, when real time channel changes ("channel surfing" in popular lingo) are required, the newly selected input signal must go through the whole system and be encoded, stored, and decoded before it is visible to the viewer. This causes a disconcerting time delay making a channel change operation appear sluggish. As seen in FIG. 1, a time-shifted system 10 may use a digitized, uncompressed video signal 12 that is derived from an incoming broadcast analog TV signal or other source. Signal 12 is encoded (compressed into, e.g., MPEG format) in an encoder 14. A host controller 20 then writes the compressed frames in a storage buffer 24 (e.g., a hard disk). For viewing, the host controller 20 reads (reading and writing occur simultaneously) the compressed video from the storage buffer and delivers it to a video decoder 18. The video decoder produces a time-shifted decoded uncompressed output 28 that is displayed to the viewer.

The delay between the input signal and the time-shifted decoded output will vary depending on system hardware and software implementation as well as compression technique used.

The same issue holds true for compressed digital broadcast signals. As seen in FIG. 2, in a set-top box using a time-shifted system, the input is a transport signal 13 that carries multiplexed compressed (e.g., MPEG) digital video signals. A transport de-multiplexer 15 provides demultiplexed compressed signals that the host controller stores and delivers as in FIG. 1.

SUMMARY OF THE INVENTION

In general, in one aspect, the invention features a time-shifted video method having a real-time mode during which real-time video frames are delivered for display. In a time-shifted mode, time-shifted video frames are delivered for display. The time-shifted video frames are delayed relative to the real-time video frames. A real-time frame is paused during a transition from the real-time mode to the time-shifted mode.

Implementations of the invention may include one or more of the following features. The transition may be between the paused real-time frame and a time-shifted version of the paused real-time frame. Trick functions may be provided during the time-shifted mode. The transition mode may be triggered by a command of a viewer or an event generated by software. The real-time video frames may be derived from input uncompressed video. The real-time video frames may be provided from an input frame buffer, from input compressed video or from a decoder that decompresses the input compressed video. The real-time mode, the time-shifted mode, and the transition may be provided by a single codec chip. The compressed video may comprise MPEG video. The information may be stored identifying the paused frame. Before the time-shifted mode occurs, the predetermined frame or the next frame after the predetermined frame may be queued up.

In general, in another aspect, the invention features apparatus that includes a port to receive an input video signal, a time-shifted processing path that stores compressed video frames based on the input video signal and delivers time-shifted stored video frames to an output, a real-time processing path that delivers real-time video to the output based on the input video signal, and control circuitry that controls transitions between the real-time video frames and the time-shifted video frames at the output.

Implementations of the invention may include one or more of the following features. The processing paths may include two decoders in a single codec. The processing paths may include buffers provided by a common memory. The apparatus may comprise a set-top box or an analog television receiver.

Among the advantages of the invention may be one or more of the following.

Incoming video signals can be viewed without going through the system pipeline, thus permitting quick channel changes. The viewer can switch seamlessly between the incoming and time-delayed video signals. Transitions to and from trick functions can be provided seamlessly. Set-top box and analog receiver implementations are possible. System bandwidth requirements are reduced and hard disc life span increased by not having to read back from the storage media in normal "real-time" operation.

Other advantages and features will become apparent from the following description and from the claims.

BRIEF DESCRIPTION OF THE DRAWING

FIG. 1 is a block diagram of a time-shifted system that uses an uncompressed digital video input.

FIG. 2 is a block diagram of a time-shifted system that uses a compressed digital video input.

DESCRIPTION OF THE PREFERRED EMBODIMENTS

Figure 3:
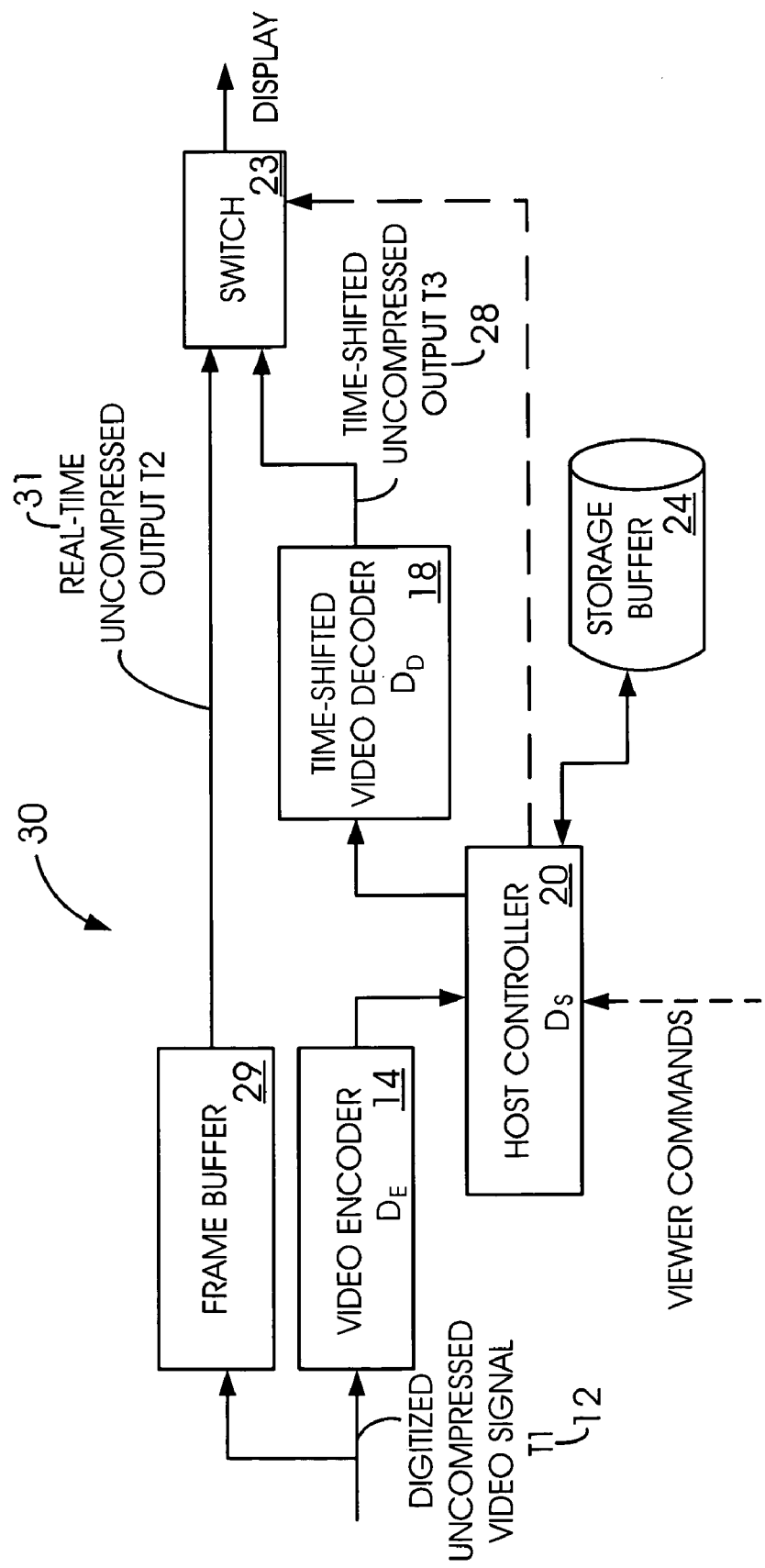
FIG. 3 is a block diagram of an improved time-shifted system that uses an uncompressed digital video input.

As seen in FIG. 3, in an improved time-shifted system 30, incoming uncompressed video is stored in a frame buffer 29 and used to provide real-time uncompressed video 31 for display through a switch 23. In a parallel processing path, the same incoming uncompressed video 12 is used to generate a time-shifted uncompressed output 28 (in a manner similar to FIG. 1) that may also be delivered through switch 23.

Figure 4:
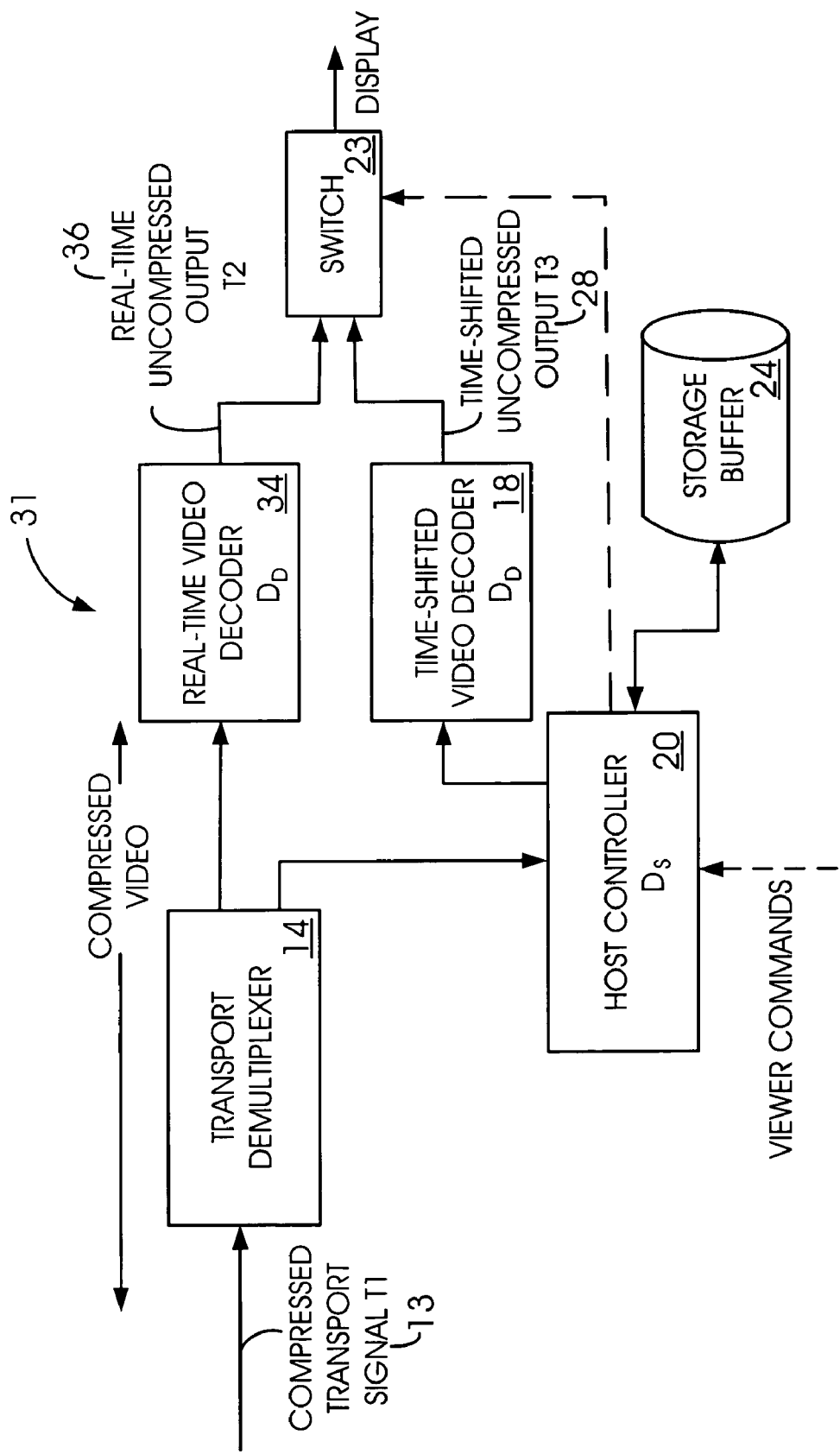
FIG. 4 is a block diagram of an improved time-shifted system that uses a compressed digital video input.

As seen in FIG. 4, in another improved time-shifted system 31, in which the input is compressed digital video 13, a second video decoder 34 is added to supplement the existing video decoder 18 of FIG. 2.

Decoder 34 receives the compressed transport signal directly from the transport de-multiplexer 14, decodes it, and delivers it as a real-time uncompressed output 36 with a timing T2 that is essentially the same as the timing T1 (T2=T1) except for a small delay ($D_D$) associated with the decoding.

Decoder 18, on the other hand, delivers a time-shifted decoded output 28 like the one generated by decoder 18 in FIG. 1 with a timing T3 that is delayed relative to T1 by a delay d. Delay d can be as large as the number of frames in the storage buffer (e.g., if the viewer has chosen to play back the oldest available frames) and as small as the minimum combined delay of the storage system and the decoder 18 (e.g., if the viewer is viewing the most recently stored frames).

The systems described in FIGS. 3 and 4 have essentially two display modes, real-time and time-shifted.

In both improved implementations, the displayed output will be switched between "time-shifted" and "near real-time" outputs as needed, using "near real-time" when viewing the live broadcast and during channel changes and "time-shifted" when doing trick modes or when viewing recorded material.

Figure 5A:
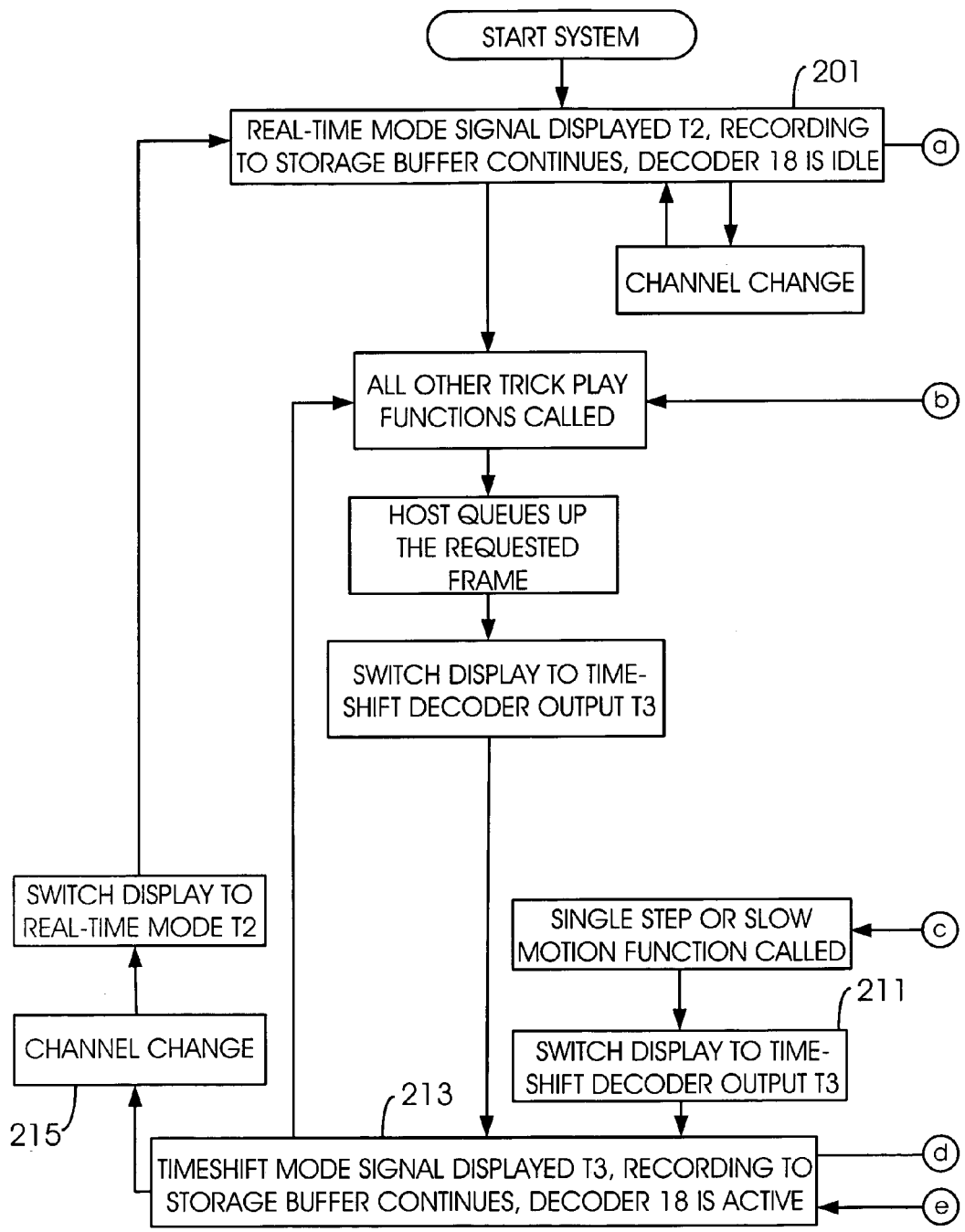
FIG. 5 is a flow diagram.

The flow of operation for switching between these modes is shown in FIG. 5.

If the viewer begins in real-time mode and stays in real-time mode, the system operates much as a conventional receiver, delivering the incoming uncompressed digital video signal directly from buffer 29 to the output for display through switch 23. A compressed version of the incoming video is continually generated by encoder 14 and stored in buffer 24 but the video stored there is not used for the output during real-time display.

The display will remain in real-time mode until a trick play is requested. If the viewer commands the system to pause, the system continues to display the frame that was in the frame buffer 29 at the time the pause was invoked. The paused frame is marked with an indicator (stamp), and is encoded normally. While the real-time video is paused, encoding and storage continue to occur. The decoder decodes the stream until the marked frame is reached and then pauses on the next frame. The display is still showing the paused frame buffer 29 at this stage.

When the time-shifted decoder 18 encounters the paused frame (identified by the stamp), it effectively queues up the next frame by not advancing to process any subsequent frame in the buffer. As soon as the next-after-paused frame is queued, the host controller can switch the display output to the time-shift decoder when a single step or slow motion command is sent. The display transition from the frame buffer 29 to time-shifted material will be seamless to the viewer. Any other trick play command after pause will also cause the display output to switch, but only once the new frame or stream is queued. Doing a seamless switch in this case is not required.

Similarly, if the viewer commands a trick feature during the real-time mode, the host controller identifies the initial frame that is to be displayed to effect the trick feature, and the time-shift decoder queues up that frame. The display then switches the output video to the time-shift decoder.

When the output is switched to the time-shifted decoder, the time-shifted decoder resumes normal Decoding and the system enters the time-shift mode.

The system will remain in time-shift display mode until a channel change command, or if the viewer selects to display the live broadcast and view the program in real time. The encode and storage process continues uninterrupted during all mode changes.

Figure 6:
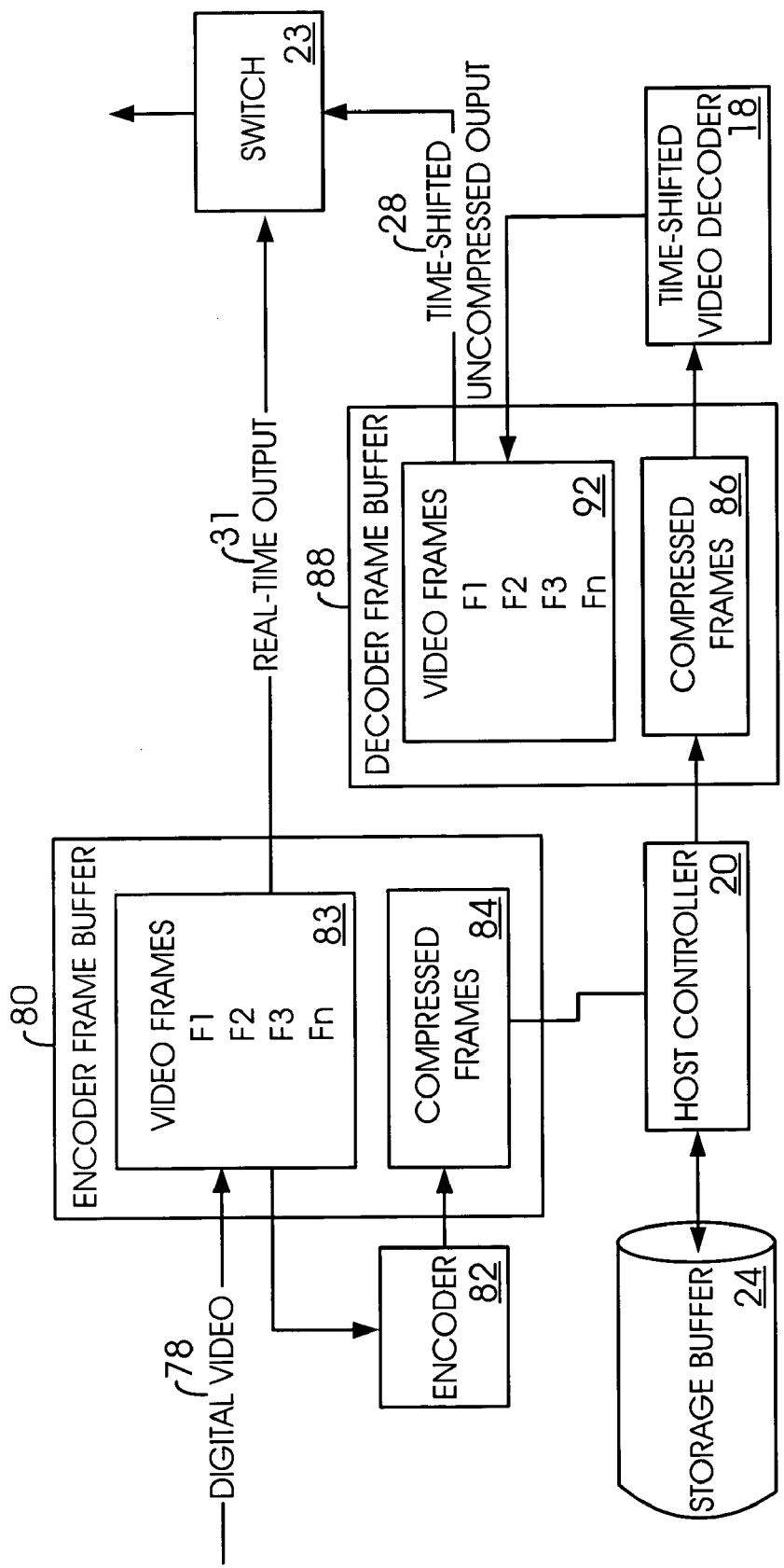
FIG. 6 is a block diagram of a buffer configuration.

As seen in FIG. 6, in one implementation of the system of FIG. 3, two frame buffers 80, 88, are used to buffer and process incoming uncompressed video and outgoing digital video frames.

The encoder frame buffer 80 includes an area 83 that stores successive incoming uncompressed digital video frames F1 . . . Fn and an area 84 that stores compressed (e.g., MPEG) frames that are generated by an (MPEG) encoder 82 based on the stored video frames in area 83.

The decoder frame buffer 88 similarly has an area 86 that holds compressed frames and an area 92 that holds uncompressed video frames that are generated by time-shifted video decoder 18 from the compressed frames. The time-shifted decoded output 28 is displayed from the video frame area 92. The real-time output 31 is displayed from area 83 of buffer 80.

The following paragraphs describe an internal implementation of a single CODEC solution for real-Time viewing and seamless switching to time-shifted material. The CODEC in this implementation is capable of sharing its memory between the encode and decode operations.

We describe this implementation with reference to FIG. 6 and also with respect to FIG. 5. For encoding, the incoming digital video frames 78 are buffered into the encoder frame buffer area of the memory 80 before they are encoded. The number of frames buffered will depend on the compression method used. For MPEG2 IBBP, for example, at least enough frames must be stored to encode the next P frame. Each frame is encoded by encoder 82 in the order prescribed by the compression algorithm used, then stored as a compressed frame 84 in the frame buffer ready for transfer to the host.

In decoding, the process is reversed. Compressed video frames are first transferred into a decoder compressed frame buffer area 88 of the memory. The frames are decoded by decoder 18, and the uncompressed frames are written to the decoder's video data buffer area of the memory 92 for display.

In typical operation, when the user is viewing in real-time, the display output of switch 23 is set to the real-time output 31, which is continually displaying the memory buffer containing the latest fully captured frame of video. The decoder 18 in this mode can be idle since nothing is displayed from its frame buffer 88. This mode is indicated in block 201 of FIG. 5. When a seamless switch from real-time to time-shifted display is needed (e.g., when a user selects pause 203, then step),the display output 31 of the codec chip will be paused by reserving this memory area and keeping the display window set to the last captured frame in the encoder frame buffer 205. Because the decoder output is not being viewed during this mode, it is possible to reclaim some of the decoder frame buffer 88 for use by the encoder. This is required since one frame area is locked in the pause mode but the encoder 82 still must continue encoding and needs all of its normally prescribed memory space.

To achieve a seamless transition to the time-shifted output 28 once the real-time frame is paused, the same encoded frame must also be queued and ready to display at the output of the decoder. When the pause function is invoked, the paused frame is encoded, marked, and stored normally 207. The resulting video stream is then read back to the decoder, decoded, but not written to the display buffer 83 (now used by the encoder). When the marked frame is reached, the decoded result is written to the decoder frame buffer 88, ready for display 209. The output display is switched 211 as soon as the frame has been decoded and ready for display, and the locked memory area that was being used for the freeze frame is released back to the decoder. The display remains in time-shifted view 213 as long as it is not required to switch back to live (e.g., channel change 215). An alternative way to implement the switch to time-shift is to queue up the frame following the marked frame, and only switch once the next command is issued.

In the case of a system, like the one in FIG. 4, in which the input is a compressed digital signal, a second decoder is required to provide the "real-time" view and the flow chart of FIG. 5 would be generally the same. However, while the minimum delay in the system of FIG. 3 of the time-shifted signal would be $D_E+D_S+D_D$, the minimum delay in the system of FIG. 4 would be only $D_S+D_D$. Also, in FIG. 3, the real-time output has a delay of one frame compared to the input (caused by the frame buffer) while in FIG. 4, the delay is $D_D$ frames An efficient way to implement the system of FIG. 4 is to use a single codec chip of a kind that has the capability to decode (decompress) two incoming digital video signals simultaneously to perform the functions of both decoders 18 and 34.

Figure 7:
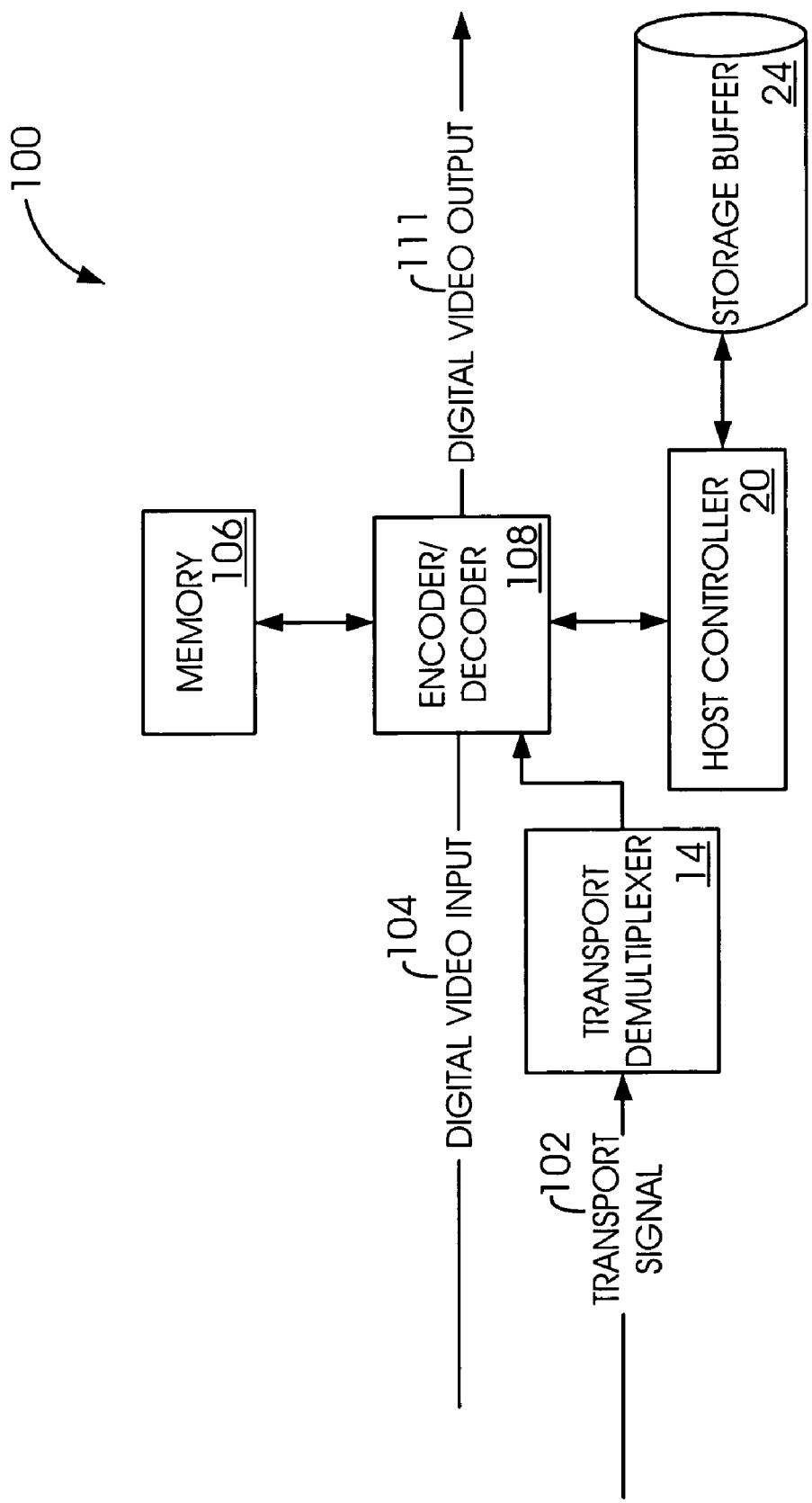
FIG. 7 is a block diagram of a single-chip configuration.

As seen in figure 7, such a single chip codec 108, when combined with a common memory 106, may be used to implement a time-shifted system 100 that can handle both incoming compressed and incoming uncompressed video signals 104, 102. Memory 106 serves the functions of both of the buffers 80, 88 of FIG. 6. The resulting digital video output 111 is controlled by the host controller to be either real-time or time-shifted as needed.

Other implementations are within the scope of the following claims. For example, the paused frame may be marked by inserting the mark in the bitstream or the frame header, or by indexing in the system software. For a compressed digital video signal system as described in FIG. 4, no marking is possible since the stream is not being manipulated, however, methods such as reading back the presentation time stamp from the decoder 34 can be used to queue up decoder 18 to the frame being paused.

The invention can be implemented in a set-top box which is capable of handling either a compressed video input, an uncompressed video input, or both.

What is claimed is:

1. A time-shifted video method comprising the steps of:
    a first buffering of an input signal having a digital video format;
    compressing said input signal in parallel with said first buffering, said compressing including a second buffering of said input signal;
    in a real-time mode, delivering a plurality of real-time video frames along a first processing path to an output for display in response to said input signal as first buffered;
    in a time-shifted mode, delivering a plurality of time-shifted video frames along a second processing path to said output for display in response to said input signal as compressed, said time-shifted video frames being delayed relative to said real-time video frames; and
    pausing at a particular one of said real-time frames during a transition from said real-time mode to said time-shifted mode, wherein said time shifted mode comprises a fast forward or a fast rewind.

2. The method of claim 1, wherein said transition is between said particular real-time frame and a time-shifted version of said particular real-time frame.

3. The method according to claim 2, wherein said transition is seamless to a viewer.

4. The method of claim 1, wherein said transition is caused by a single command of a viewer.

5. The method of claim 1, wherein the real-time video frames are derived from uncompressed video.

6. The method of claim 1, wherein said real-time video frames are derived from said input signal having a compressed video format.

7. The method of claim 6, wherein said real-time video frames are provided from a decoder that decompresses said input signal.

8. The method of claim 7, wherein said input signal comprises MPEG video.

9. The method of claim 1, wherein the real-time mode, the time-shifted mode, and the transition are provided by a single codec chip.

10. The method of claim 1, wherein (i) information is stored identifying said particular real-time video frame and (ii) before the time-shifted mode occurs, a next frame of said time-shifted video frames in display sequence after said particular real-time video frame is queued up for display such that said transition is from said particular real-time video frame to said next frame of said time-shifted video frames.

11. The method of claim 1, wherein said transition is triggered by an event generated by software.

12. An apparatus comprising:
    a real-time decoder configured to (i) generate a first output signal by decompressing a compressed digital video input signal and (ii) pause a frame of said first output signal during a transition from a first mode to a second mode;
    a frame storage system configured to store said compressed digital video input signal separately from said real-time decoder;
    a time-shifted decoder (i) coupled to said frame storage system and (ii) configured to generate a second output signal in response to said compressed digital video input signal stored in said frame storage system; and
    a controller configured to generate a command configured to control presenting (i) said first output signal when in said first mode and (ii) said second output signal when in said second mode, wherein said second mode comprises a fast forward or a fast rewind.

13. An apparatus comprising:
    an input for receiving a video signal in an uncompressed format;
    a frame buffer directly connected to said input and configured to (i) generate a first output signal by buffering said video signal and (ii) pause said first output signal at a frame during a transition from a first mode to a second mode;
    an encoder configured to generate a first intermediate signal by compressing said video signal;
    a controller separate from said encoder and configured to (i) receive said first intermediate signal and (ii) present a second intermediate signal;
    a frame storage system directly connected to said controller and configured to (i) store said first intermediate signal and (ii) generate said second intermediate signal; and
    a time-shifted decoder separate from said controller and configured to generate a second output signal by decompressing said second intermediate signal, wherein said controller is further configured to generate a command configured to control presenting (i) said first output signal when in said first mode and (ii) said second output signal when in said second mode, wherein said second mode comprises a fast forward or a fast rewind.

14. The apparatus of claim 13, wherein the encoder and the time-shifted decoder are provided in a single codec.

15. The apparatus according to claim 13, wherein said encoder receives said video signal from said frame buffer.

16. An apparatus comprising:
a controller configured to receive (i) a first command and (ii) a video input signal in a compressed format;
a real-time decoder configured to (i) generate a first output signal in response to decompressing said video input signal and (ii) pause a frame of said first output signal during a transition from a first mode to a second mode;
a frame storage system coupled to said controller to exchange said video input signal; and
a time-shifted decoder coupled to said controller and configured to generate a second output signal in response to (i) said video input signal received from said controller and (ii) said first command;
wherein said controller is further configured to generate a second command to control presenting (i) said first output signal when in said first mode and (ii) said second output signal when in said second mode, wherein said second mode comprises a fast forward or a fast rewind.

17. The apparatus according to claim 16, wherein said real-time decoder and said time-shifted decoder are provided in a single codec.

18. The apparatus according to claim 16, further comprising a demultiplexer configured to demultiplex said video input signal to said real-time decoder and said controller.

19. An apparatus comprising:
a first frame buffer configured to (i) generate a first signal and a second signal by buffering an input signal, (ii) pause said first signal at a frame during a transition from a real-time mode to a time-shifted mode and (iii) buffer a third signal;
a controller connected to said first frame buffer to receive said third signal;
a buffer connected to said controller to store said third signal;
an encoder connected to said first frame buffer and configured to generate said third signal by compressing said second signal;
a decoder configured to generate a fourth signal by decompressing said third signal as retrieved from said buffer; and
a switch connected to said first frame buffer and configured to present an output signal comprising (i) said first signal when in said real-time mode and (ii) said fourth signal when in said time-shifted mode, wherein said time shifted mode comprises a fast forward or a fast rewind.

20. The apparatus of claim 19; having a first processing path for said real-time mode and a second processing path for said time-shifted mode.

21. The apparatus of claim 19, wherein the apparatus comprises a set-top box.

22. The apparatus of claim 19, wherein said output signal is viewable by an analog television.

23. The apparatus according to claim 19, further comprising a second frame buffer disposed between said controller, said time-shifted decoder and said switch and configured to (i) buffer said third signal retrieved from said buffer and (ii) buffer said fourth signal prior to said switch.

* * * * *